US012657908B2

(12) United States Patent
Gupta et al.

(10) Patent No.: US 12,657,908 B2
(45) Date of Patent: Jun. 16, 2026

(54) AUTOMATED IMAGING SYSTEM FOR OBJECT FOOTPRINT DETECTION AND A METHOD THEREOF

(71) Applicant: Jio Platforms Limited, Gujarat (IN)

(72) Inventors: Pradip Gupta, West Bengal (IN); Naveen Kumar Pandey, Uttar Pradesh (IN); Balakrishna Pailla, Goa (IN); Shailesh Kumar, Telangana (IN); Shubham Bhardwaj, Telangana (IN); Anmol Karnwal, Uttar Pradesh (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 602 days.

(21) Appl. No.: 17/823,836

(22) Filed: Aug. 31, 2022

(65) Prior Publication Data

US 2023/0066119 A1 Mar. 2, 2023

(30) Foreign Application Priority Data

Aug. 31, 2021 (IN) .............................. 202121039487

(51) Int. Cl.
*G06F 16/29* (2019.01)
*G06V 10/774* (2022.01)
*G06V 20/10* (2022.01)
*G06V 20/13* (2022.01)

(52) U.S. Cl.
CPC ............ *G06V 20/176* (2022.01); *G06F 16/29* (2019.01); *G06V 10/774* (2022.01); *G06V 20/13* (2022.01)

(58) Field of Classification Search
CPC .... G06V 20/176; G06V 20/13; G06V 10/774; G06T 2207/30184; G06T 7/12; G06T 2207/20084; G01C 21/3852; G06F 16/29; G06N 20/00
See application file for complete search history.

(56) References Cited

U.S. PATENT DOCUMENTS 11,055,566 B1 * 7/2021 Pham ..................... G06V 10/82
2021/0312632 A1 * 10/2021 Ma ........................ G06V 10/267

FOREIGN PATENT DOCUMENTS

CN 112669446 A * 4/2021

OTHER PUBLICATIONS

Wen et al. "Automatic building extraction from Google Earth images under complex backgrounds based on deep instance segmentation network." Sensors 19.2 (2019): 333 (Year: 2019).*

* cited by examiner

*Primary Examiner* — Sumati Lefkowitz
*Assistant Examiner* — Michael Adam Shariff
(74) *Attorney, Agent, or Firm* — FINNEGAN, HENDERSON, FARABOW, GARRETT & DUNNER, LLP

(57) ABSTRACT
The present disclosure provides for a system for facilitating a completely automated process that may directly fetch an imagery of a given location and area from any mapping module and extract a plurality of objects in the given imagery. Further, a deep learning-based object segmentation such as but not limited to a cascaded reverse mask RCNN framework method may generate a set of predefined vectors associated with the image. The system may be configured to automate the generation of the predefined vectors based on the image received from the image sensing assembly.

18 Claims, 9 Drawing Sheets

530

NW & SE LATLONG COORDS

NW=15.394745, 73.832864, SE=15.393420 73.834237
502

MAPS 504

DL SEGMENTATION MODULE 506

POST PROCESSING 508

VECTORISATION 510

OUTPUT SHAPE FILE 512

100

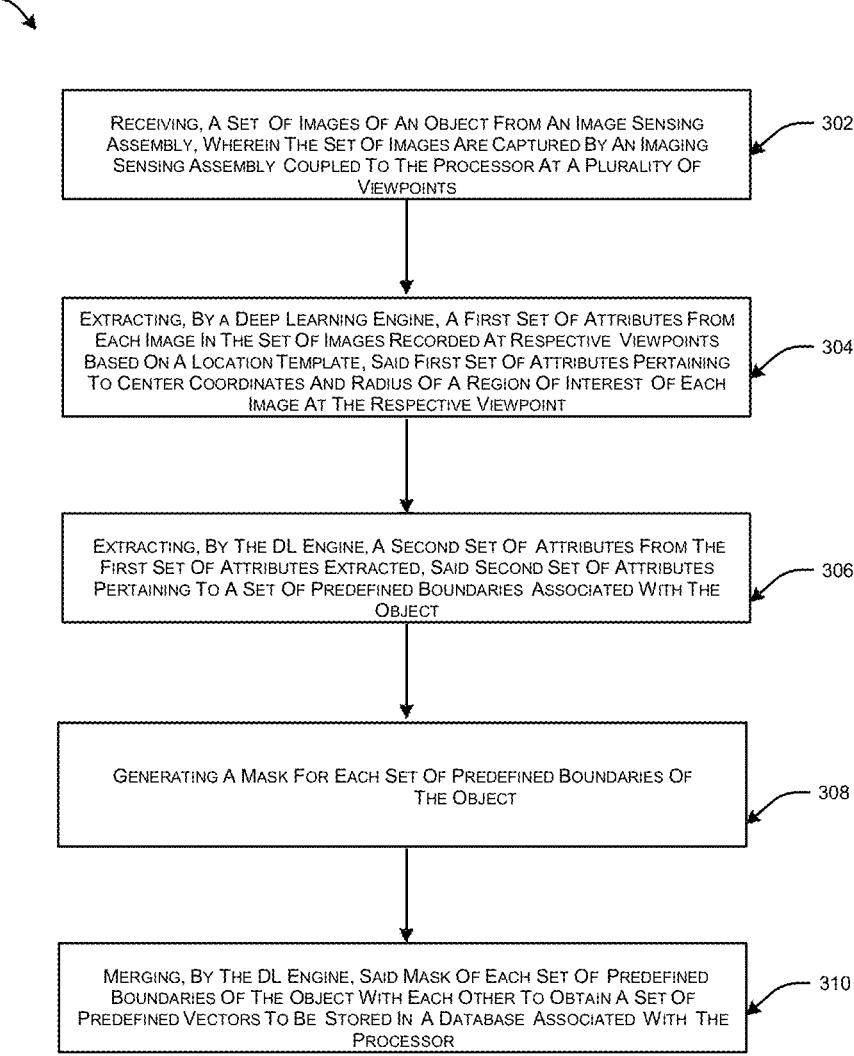

300

RECEIVING, A SET OF IMAGES OF AN OBJECT FROM AN IMAGE SENSING ASSEMBLY, WHEREIN THE SET OF IMAGES ARE CAPTURED BY AN IMAGING SENSING ASSEMBLY COUPLED TO THE PROCESSOR AT A PLURALITY OF VIEWPOINTS — 302

EXTRACTING, BY A DEEP LEARNING ENGINE, A FIRST SET OF ATTRIBUTES FROM EACH IMAGE IN THE SET OF IMAGES RECORDED AT RESPECTIVE VIEWPOINTS BASED ON A LOCATION TEMPLATE, SAID FIRST SET OF ATTRIBUTES PERTAINING TO CENTER COORDINATES AND RADIUS OF A REGION OF INTEREST OF EACH IMAGE AT THE RESPECTIVE VIEWPOINT — 304

EXTRACTING, BY THE DL ENGINE, A SECOND SET OF ATTRIBUTES FROM THE FIRST SET OF ATTRIBUTES EXTRACTED, SAID SECOND SET OF ATTRIBUTES PERTAINING TO A SET OF PREDEFINED BOUNDARIES ASSOCIATED WITH THE OBJECT — 306

GENERATING A MASK FOR EACH SET OF PREDEFINED BOUNDARIES OF THE OBJECT — 308

MERGING, BY THE DL ENGINE, SAID MASK OF EACH SET OF PREDEFINED BOUNDARIES OF THE OBJECT WITH EACH OTHER TO OBTAIN A SET OF PREDEFINED VECTORS TO BE STORED IN A DATABASE ASSOCIATED WITH THE PROCESSOR — 310

| GROUND SURVEY TEAM MARKS BUILDINGS WITH SMALL RECTANGLES USING MOBILE APP 402 | → | GIS EXPERT VALIDATES THE DATA UPLOADED BY THE SURVEY TEAM AND MARKS POLYGONS IN THE REQUIRED AREAS 404 | → | GIS DATABASE 406 | → | DIFFERENT BUSINESS USE THE GIS DATABASE FOR PLANNING ACTIVITIES 408 |

NW & SE LATLONG COORDS → MAPS 504 → DL SEGMENTATION MODULE 506 → POST PROCESSING 508 → DL SEGMENTATION MODULE 510 → OUTPUT SHAPE FILE 512

NW=15.394745, 73.832864, SE=15.393420 73.834237 502

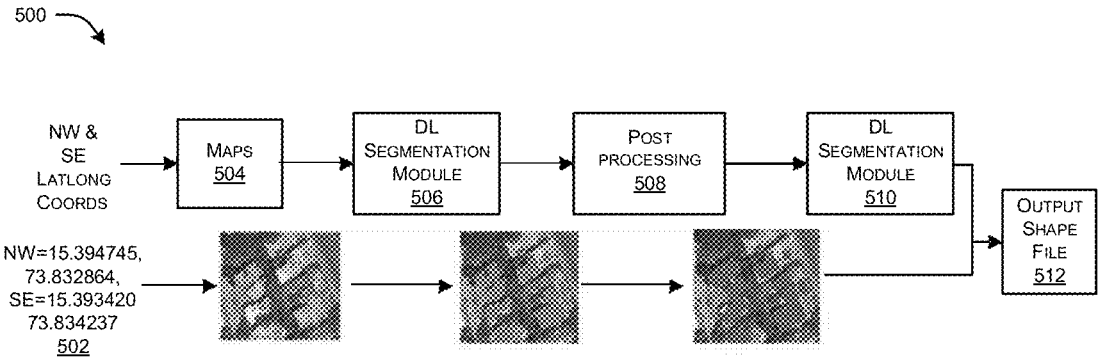

AUTOMATED IMAGING SYSTEM FOR OBJECT FOOTPRINT DETECTION AND A METHOD THEREOF

TECHNICAL FIELD

The invention is in the field of profile mapping of objects, and relates to the imaging of 3-dimensional (3D) objects, and more specifically to the fetching and processing of imagery of a given location or an object.

BACKGROUND

Background description includes information that may be useful in understanding the present invention. It is not an admission that any of the information provided herein is prior art or relevant to the presently claimed invention, or that any publication specifically or implicitly referenced is prior art.

Identifying building footprints in a particular urban/rural settlement of interest finds its application in various areas like telecom fibre layout estimation, cellular tower installation, disaster management, community mapping, etc. Traditionally, identifying these human settlements required a team of field agents to perform field visits and mark the regions using a global positioning system (GPS) enabled application. The data is then sent back to a centralised database to be curated and processed manually by a team of GIS experts to create geo spatial assets out of these crudely marked building boundaries. The process evidently been extremely sensitive to human errors required extensive manual labour and has been slow to scale.

Building detection from satellite imagery relates to the broader field of Remote Sensing and more specifically to Geo Spatial AI using Computer Vision. It plays a pivotal role in efficient geospatial mapping of a region of interest and aids urban planning and development, thereby contributing to overall social and economic growth. At one side, it enables decision-makers to estimate population and extrapolate from this baseline for efficient allocation of resources. On the other side, it allows cost-effective scaling of industrial planning like laying out fibre networks and installation of new cellular towers, drainage systems, electric line, LPG line planning etc. In cases of natural calamities, like the cyclone Ampha that hit the eastern cities of India in 2020 or the pandemic of COVID-19 worldwide, automated building extraction is the most effective way to plan a targeted emergency response in a timely manner.

However, the traditional systems are error-prone and involve a slow workflow of building extraction in specialized manual labor and field visits and has the following drawbacks: the specialized geographic information system (GIS) talent needed to manually label and curate building boundaries are extremely expensive and needs a lot of time. The systems are difficult and not at all scalable. One prior art discloses a system, computer program product and method for using a convolution neural network to auto-determine a floor height and floor height elevation of a building and does not focus on computing floor height and elevation rather than rooftops from satellite imagery. Another prior art discloses about a semantic and instance segmentation that was written in the context of autonomous vehicles environment rather than satellite imagery, there is a mention of the use of neural networks Long short-term memory (LSTM)/GRUs but nowhere overlaps with any cascaded segmentation architecture using UNet. One more prior art uses lane and lane mark detection method based on capsule network deep learning architecture. However, this prior art focuses on the problem of only lane detection in the context of autonomous vehicles. Uses entirely different architecture, capsule networks. Yet another prior art mentions about a method and apparatus for detecting CNN-based pseudo-3D boundaries using instance segmentation but focuses on estimating 3D poses using 2D images in the context of autonomous vehicles while another discloses a satellite image film-covering farmland identification and extraction method and system and focuses on farmland identification rather than building rooftop detection. Uses spectral features instead of simple RGB images. Uses a decision tree classification over spectral images instead of deep neural network-based image segmentation. Another prior art mentions about a High-precision land cover classification method based on the high-resolution satellite image but mainly focuses on land cover classification rather than building rooftop detection. Uses a combination of spectral features as well as texture and geometry from images instead of applying a deep neural network-based image segmentation directly on RGB images. A prior art discloses about a building footprint extraction apparatus, method and computer program product—CoreLogic Solutions LLC. But the method uses a device that allows users to partially mark the positions of the buildings by moving around the buildings and then use classical image processing to refine the structure by discriminating between man-made structures i.e building and natural surroundings.

Hence, there is a requirement in the art to devise a method and an imaging system to mitigate the limitations existing in prior art.

OBJECTS OF THE PRESENT DISCLOSURE

Some of the objects of the present disclosure, which at least one embodiment herein satisfies are as listed herein below.

It is an object of the present disclosure to provide a simple, compact, portable and cost-effective imaging system for non-contact and non-destructive measurement of full-field 3-dimensional profile of the surfaces of buildings and structures of a given location.

It is an object of the present disclosure to provide a method for real-time, remote, in-situ and simultaneous extremely low-cost method when compared to specialized GIS talent needed to manually label and curate building boundaries.

It is an object of the present disclosure to provide a method for an easy logistics to operationalize as any other software or application.

It is an object of the present disclosure to provide a system and method that is infinitely scalable as the process is completely automated and eliminates manual labor and scaling requires only adding more servers.

It is an object of the present disclosure to provide a method for achieving results comparable to extraction from GIS specialists even in the most cluttered settlements in lesser time.

It is an object of the present disclosure to provide a system and method for identifying and updating building footprints and store in a GIS database.

It is an object of the present disclosure to provide a system and method for periodically identifying new settlement clusters (newly constructed buildings)

It is an object of the present disclosure to provide a system and method for periodically updating existing clusters for new buildings.

It is an object of the present disclosure to provide a system and method for extending the same problem to infrastructure components like roads, bridges, flyovers etc.

It is an object of the present disclosure to provide a system and method for facilitating geospatial assets form the bedrock of geospatial intelligence and aid in different kind of infrastructure planning activities like fibre layout estimation, telecom tower planning, route optimization for deliveries etc. that are vital to multiple Jio businesses in Retail, Telecom etc.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for an automated imaging sensing system. The system may include an image module. The image module may further include one or more processors coupled with a memory that stores instructions which when executed by the one or more processors causes the system to: receive a set of images of an object from an image sensing assembly. The set of images may be obtained at a plurality of viewpoints. The system may further extract, by using a Deep Learning (DL) engine, a first set of attributes from each image in the set of images recorded at respective viewpoints based on a location template. In an embodiment, the first set of attributes may pertain to centre coordinates and radius of the region of interest of each image at the respective viewpoints. In an embodiment, the DL engine may be operatively coupled to the one or more processors. The system may further extract, by using the DL engine, a second set of attributes from the first set of attributes extracted, the second set of attributes pertaining to a set of predefined boundaries associated with the object. The system may further generate, by using the DL engine, a mask for each set of predefined boundaries of the object and, merge, by the DL engine, the mask of each set of predefined boundaries of the object with each other to obtain a set of predefined vectors to be stored in a database associated with the system.

In an embodiment, the plurality of viewpoints refers to coordinates and radius of an object or region of interest, latitude, longitude of a region.

In an embodiment, the set of predefined boundaries comprises background, object interior, object edges and object separators.

In an embodiment, an object detection module is operatively coupled to the one or more processors, wherein the object detection module is configured to process the extracted second set of attributes; obtain a set of features from the processed second set of attributes and map down one or more precise unique features of the object from the set of features obtained.

In an embodiment, the DL engine may be further configured to obtain a set of values of each image of the set of images, process the set of values of each said image to yield a set of predefined vectors, and, generate a trained model configured from the set of predefined vectors.

In an embodiment, the DL engine may be further configured to automate fetching of an image from the image sensing assembly to generate the predefined set of vectors specific to the image.

In an embodiment, the set of values of each image may be any or a combination of red green blue (RGB) values, greyscale values, and luma, blue projection and red projection (YUV) values.

In an embodiment, the trained model may be trained to take an image automatically as an input and return a minimum rotated bounding box for object along with one or more pixel labels associated with the object.

In an embodiment, a segmentation module may be operatively coupled with the DL engine and may be configured to cascade a multi-class segmentation task to generate a plurality of pixel-level semantic features in a hierarchal manner.

In an embodiment, the image sensing assembly may include one or more analog electronic input source configured for recording a plurality of physical parameters simultaneously with the set of images and a network connecting one or more camera sensors and the one or more analog input sources to the computing device.

In an aspect, the present disclosure provides for method for facilitating automated image sensing. The method may include the steps of receiving, by an image module, a set of images of an object from an image sensing assembly. The set of images may be obtained at a plurality of viewpoints. The image module may include one or more processors coupled with a memory that stores instructions which are executed by the one or more processors. The method may further include the step of extracting, by using a Deep Learning (DL) engine, a first set of attributes from each image in the set of images recorded at respective viewpoints based on a location template, wherein the first set of attributes pertain to centre coordinates and radius of the region of interest of each image at the respective viewpoints. The DL engine may be operatively coupled to the one or more processors. Further, the method may include the steps of extracting, by using the DL engine, a second set of attributes from the first set of attributes extracted, the second set of attributes pertaining to a set of predefined boundaries associated with the object and generating, by using the DL engine, a mask for each set of predefined boundaries of the object. Furthermore, the method may include the step of merging, by the DL engine, the mask of each set of predefined boundaries of the object with each other to obtain a set of predefined vectors to be stored in a database associated with the system.

BRIEF DESCRIPTION OF THE DRAWINGS

In the FIG.s, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3 illustrates an exemplary representation of a flow diagram associated with the proposed method in accordance with an embodiment of the present disclosure.

FIG. 4 illustrates an exemplary traditional configuration of an imaging system in accordance with an embodiment of the present disclosure.

5

Figure 5B:
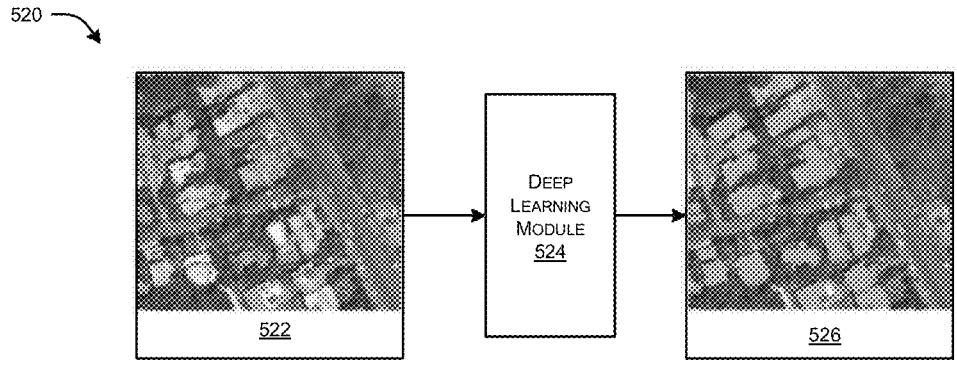
Figure 5C:
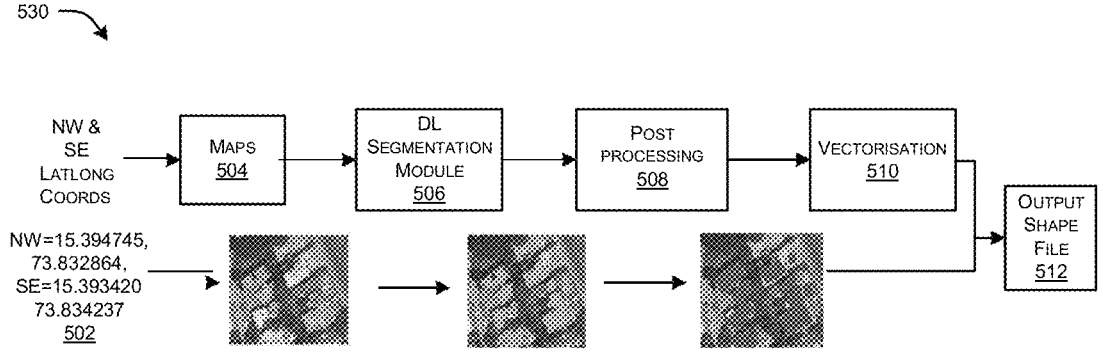

FIGS. 5A-5C illustrate exemplary representations of configurations of operation of the imaging system in accordance with an embodiment of the present disclosure.

Figure 6:
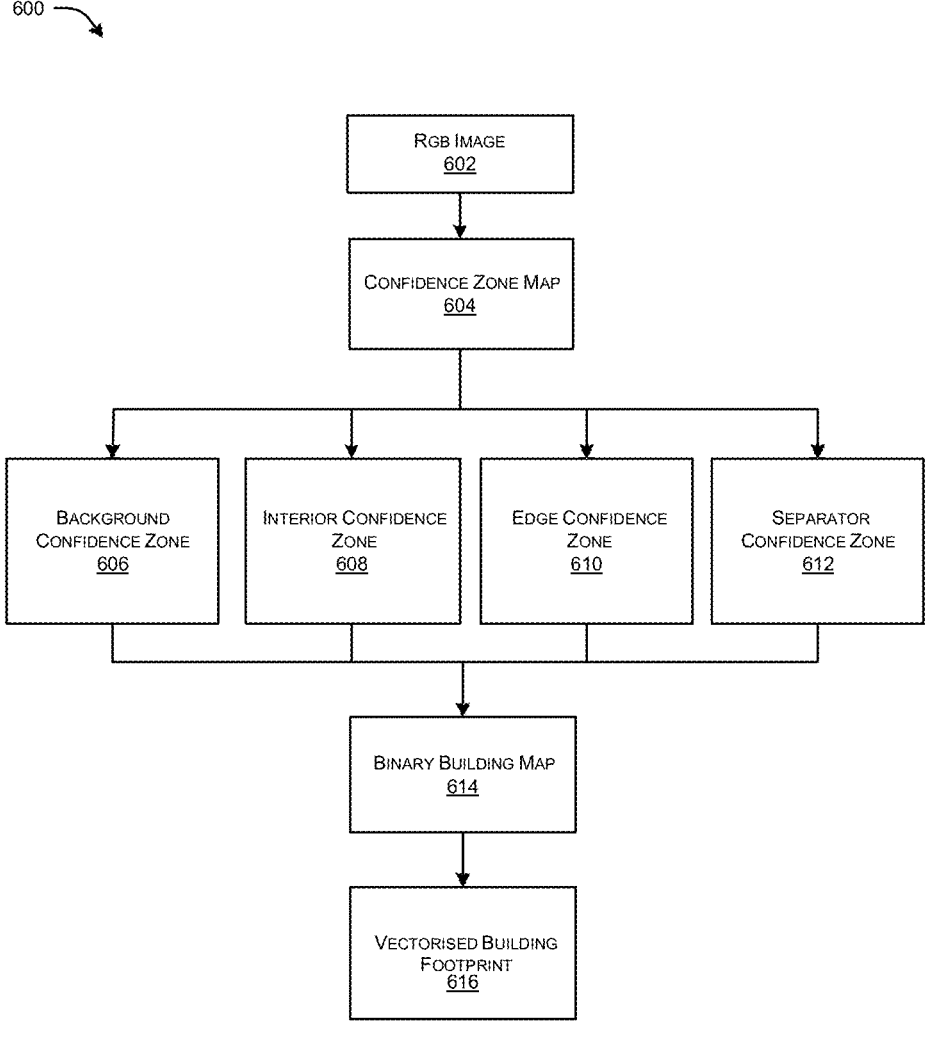

FIG. 6 illustrates an exemplary representation of a flow diagram associated with an operational method in accordance with an embodiment of the present disclosure.

Figures 7A, 7B, 7C:
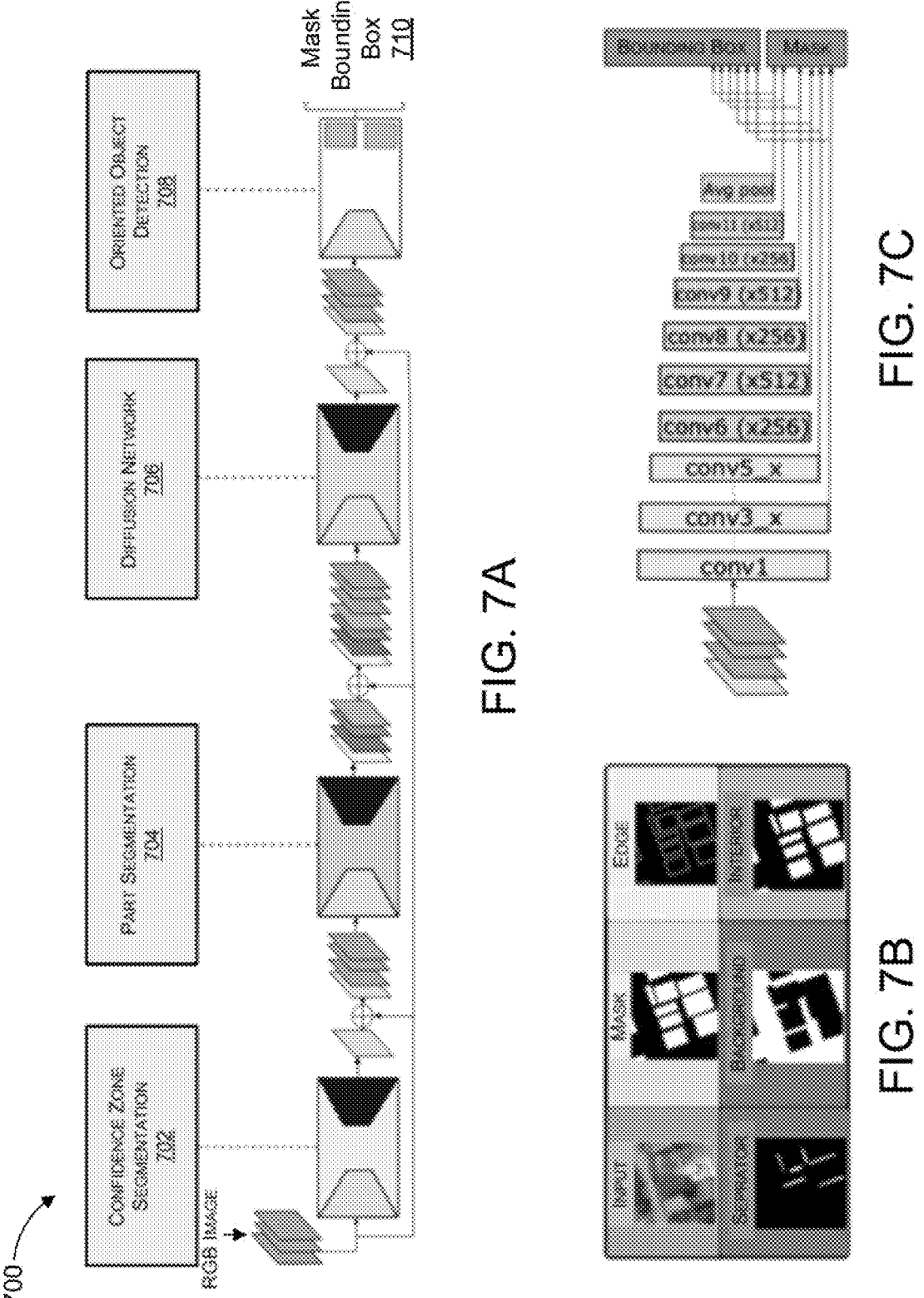

FIGS. 7A-7C illustrate exemplary representations for executing the operational method for image acquisition during test, image correlation, reconstruction of profile, object distance/depth calculation, in accordance with an embodiment of the present disclosure.

Figure 8:
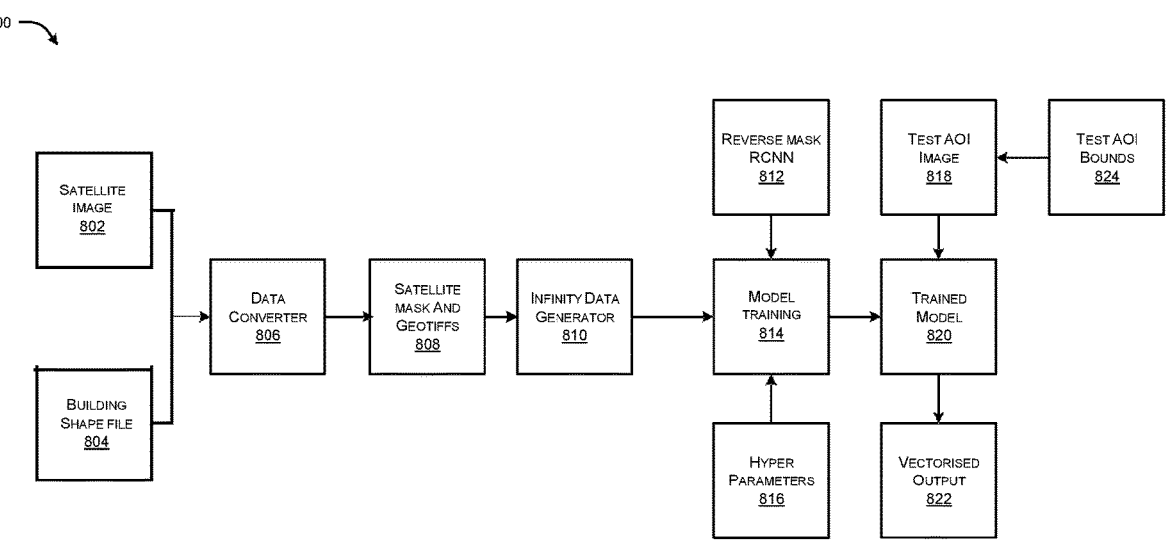

FIG. 8 illustrates an exemplary model training process, in accordance with an embodiment of the present disclosure.

Figure 9:
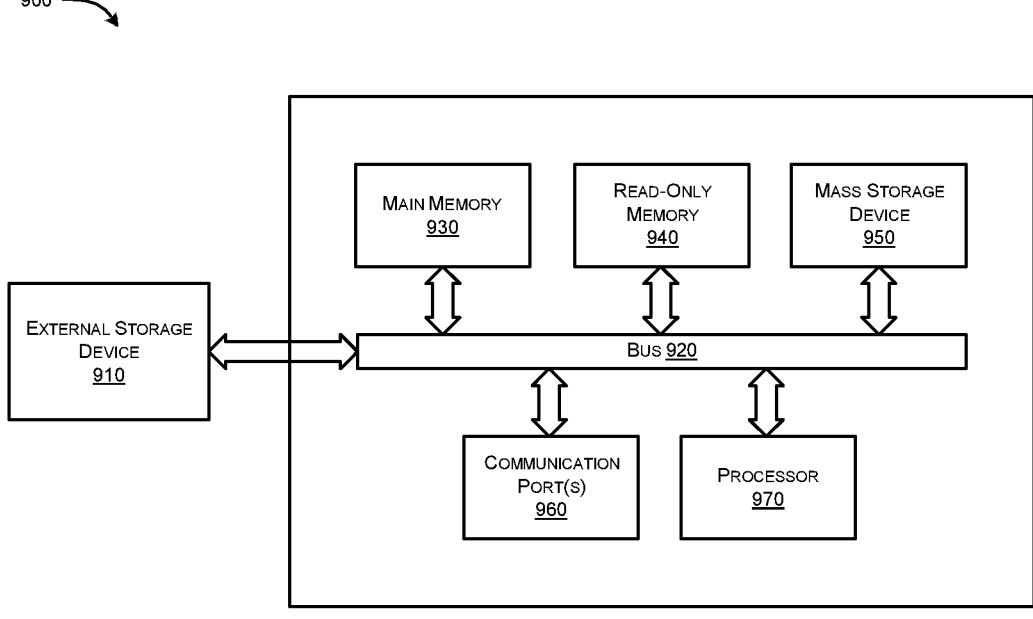

FIG. 9 illustrates an exemplary computer system in which or with which embodiments of the present invention can be utilized in accordance with embodiments of the present disclosure.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

The present disclosure provides herein is an imaging system and a method for mapping of objects, and relates to the imaging of 3-dimensional (3-D) objects, and more specifically to the fetching and processing of imagery of a given location or an object.

In an aspect, the present disclosure further provides for a system for facilitating a completely automated process that may directly fetch imagery of a given location or an object and area from any mapping module and extract a plurality of objects in the given imagery. Further, a deep learning-based object segmentation methods such as but not limited to a cascaded reverse mask RCNN framework that reaches state of the art even in cluttered rural and urban environments.

Several embodiments of the present disclosure are described hereafter in detail with reference to the drawings. The specifications herein can be considered as the illustration of the invention, and is not intended to limit the scopes of the invention specific to the embodiments described by the drawings and the description provided below for an imaging system.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. Thus, the present invention is to be accorded the widest scope encompassing numerous alternatives, modifications and equivalents consistent with the principles and features disclosed.

The embodiments will be clear with the illustrative drawings explained henceforth.

Figure 1:
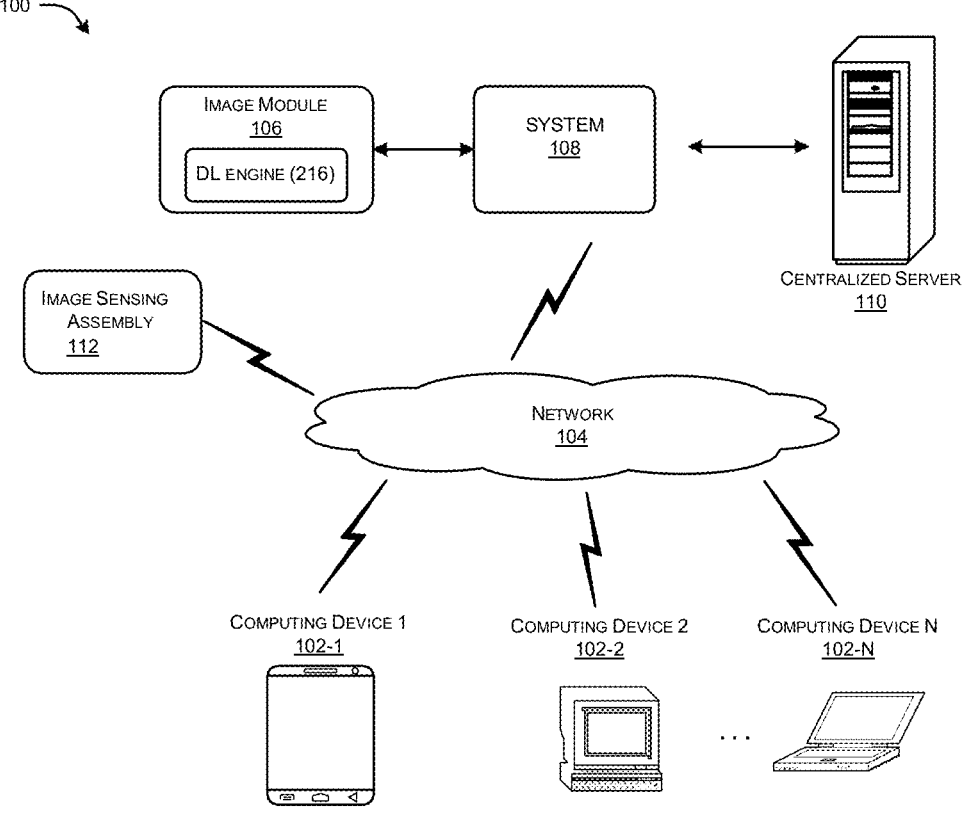
FIG. 1 illustrates an exemplary network architecture with which or in which the system of the present disclosure can be implemented in accordance with an embodiment of the present disclosure.
Figure 2:
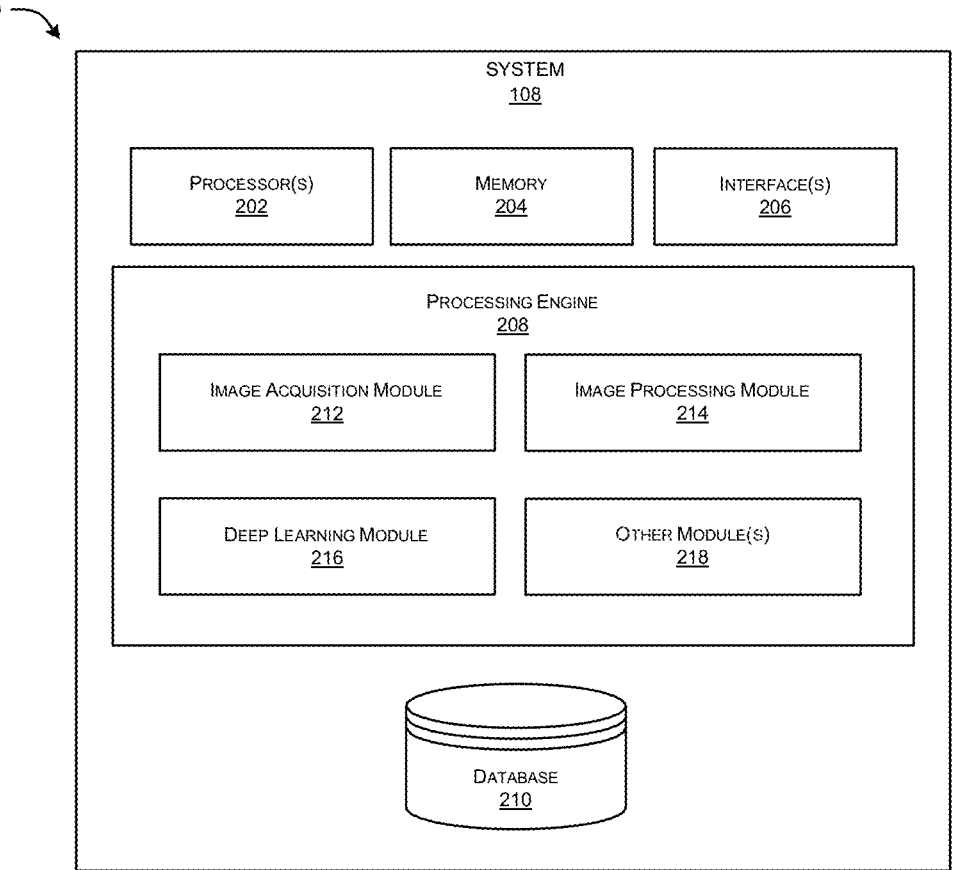
FIG. 2 illustrates components of a processor in in accordance with an embodiment of the present disclosure.

Referring to FIG. 1 that illustrates an exemplary network architecture (100) in which or with which the imaging sensing system (108) (interchangeably referred to as the system (108) of the present disclosure can be implemented, in accordance with an embodiment of the present disclosure. As illustrated, the exemplary architecture (100) includes a system (108) equipped with an imaging module (106) having a deep learning (DL) engine (216) (Ref. FIG. 2) for directly fetching an imagery from an image sensing assembly (112) of a given location and area from any mapping module and extracting a plurality of objects in the given imagery.

In an exemplary embodiment, the plurality of objects may be buildings, like roads, bridges, flyovers but not limited to the like. The imaging module (106) may be operatively coupled to at least one computing device (102-1, 102-2, . . . 102-N) (hereinafter interchangeably referred as a computing device (102); and collectively referred to as 102). The computing device (102) and the system (108) may communicate with each other over a network (104). The system (108) may further be associated with a centralized server (110). The data can be stored to computer hard-disk, external drives, cloud systems or centralized server (110).

In an embodiment, the network (104) that can include any or a combination of a wireless network module, a wired network module, a dedicated network module and a shared network module. Furthermore, the network can be implemented as one of the different types of networks, such as Intranet, Local Area Network (LAN), Wide Area Network (WAN), Internet, and the like. The shared network can represent an association of the different types of networks that can use a variety of protocols, for example, Hypertext Transfer Protocol (HTTP), Transmission Control Protocol/Internet Protocol (TCP/IP), Wireless Application Protocol (WAP), and the like.

In an embodiment, the deep learning (DL) engine (216) may cause the system (108) to receive a set of images of an object from an image sensing assembly (112), at a plurality of viewpoints. The plurality of viewpoints may refer to coordinates and radius of a region of interest, latitude, longitude and the like. For example, the image sensing assembly (112) can take images of a location having North west (NW)=15.394745, 73.832864 and South west (SW) =15.393420, 73.834237.

The DL engine (216) may further cause the system (108) to extract a first set of attributes from each image in the set of images recorded at respective viewpoints based on a location template. The first set of attributes may refer to center coordinates and radius of the region of interest of each image at the respective viewpoints. The DL engine (216) may further extract a second set of attributes from the first set of attributes extracted. The second set of attributes may pertain to a set of predefined boundaries associated with the object. For example, the set of predefined boundaries may include background, building interior, building edges and building separators (i.e. the gap between two close buildings but not limited to the like.

The DL engine (216) may further cause the system to generate a mask for each set of predefined boundaries of the object and then merge the masks of each set of predefined boundaries of the object with each other to obtain a set of predefined vectors to be stored in a database associated with the system (108).

In an embodiment, an object detection module (not shown in FIG. 1) may process the extracted second set of attributes to obtain a set of features that may map down the precise unique features of the object.

In an exemplary embodiment, the system (108) may generate, through the DL engine, a trained model configured to process the image to yield a set of predefined vectors such as a set of geometrical structures as target output. For example, the boundary and its vicinity information may be learnt by the DL engine (216) utilising the prior data coming from the previous module and predict each pixel assigned to one of the four classes to implicitly capture the geometric properties which may be otherwise difficult to learn, for example the pixels between two close buildings. Thus, in an exemplary embodiment, the DL engine (216) may facilitate to automate the fetching of an image from the image sensing assembly (112) to generate the predefined set of vectors specific to the image.

In an exemplary embodiment, the image from the image sensing assembly (112) may be an RGB image, a greyscale image, YUV image and the like.

In an exemplary embodiment, in a way of example and not as a limitation, an RGB image may be fetched from the image sensing assembly (112) and may act as an input and return a minimum rotated bounding box for each building instance along with the respective pixel labels. In an embodiment, a segmentation module associated with the system may cascade multi-class segmentation task to generate pixel-level semantic features in a hierarchal manner and further apply an optimized object detection on the extracted feature maps to obtain precise object corner points.

In an embodiment, the image sensing assembly (112) may further include one or more analog electronic input sources configured for recording several physical parameters simultaneously with the images and a wired or a wireless network (104) connecting one or more camera sensors (204) and the one or more analog input sources to the computing device (102). The wired network (104) may include one or more cables to connect the one or more camera sensors and the one or more analog input In an embodiment, the image profile mapping of the object using their respective computing devices via set of instructions residing on any operating system, including but not limited to, Android™, iOS™, and the like. In an embodiment, the computing device (102) may include, but not limited to, any electrical, electronic, electro-mechanical or an equipment or a combination of one or more of the above devices such as mobile phone, smartphone, virtual reality (VR) devices, augmented reality (AR) devices, pager, laptop, a general-purpose computer, personal computer (PC), workstation, industrial computer, a super-computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (102) may not be restricted to the mentioned devices and various other devices may be used. A smart computing device may be one of the appropriate systems for storing data and other private/sensitive information.

In an embodiment, the system (108) for imaging may include one or more processors coupled with a memory, wherein the memory may store instructions which when executed by the one or more processors may cause the system to perform the selection, evaluation and score generation steps as described hereinabove. FIG. 2 with reference to FIG. 1, illustrates an exemplary representation of the system (108) for directly fetching satellite imagery from an image sensing assembly (112) of a given location and area from any mapping module and extracting a plurality of objects in the given satellite imagery in accordance with an embodiment of the present disclosure. In an aspect, the system (108) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. In an exemplary embodiment, the imaging module can be embedded to ASIC or semiconductor chips for increasing the processing time. Among other capabilities, the one or more processor(s) (202) may be configured to fetch and execute computer-readable instructions stored in a memory (204) of the system (108). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (108) may include an interface(s) 206. The interface(s) 206 may comprise a variety of interfaces, for example, interfaces for data input and output devices, referred to as I/O devices, storage devices, and the like. The interface(s) 206 may facilitate communication of the system (108). The interface(s) 206 may also provide a communication pathway for one or more components of the system (108). Examples of such components include, but are not limited to, processing engine(s) (208) (engine(s) are referred to as module(s)) and a database (210).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (108) may comprise the machine-readable storage medium storing the instructions and the processing resource to execute the instructions, or the machine-readable storage medium may be separate but accessible to the system (108) and the processing resource. In other examples, the processing engine(s) (208) may be implemented by electronic circuitry.

The processing engine (208) may include one or more engines selected from any of an image acquisition module (212), an image processing module (214), a deep learning (DL) engine (216), and other modules (218). The other modules (218) may help in other functionalities such as image acquisition, calibration, processing, post-processing of the images and data obtained with other analog inputs and for storage of images and post-processed data.

FIG. 3 illustrates an exemplary representation of a flow diagram associated with the proposed method in accordance with an embodiment of the present disclosure. As illustrated, in an aspect, the method (300) may include the step at 302 of receiving, by an imaging module, a set of images of an object from an image sensing module, wherein the set of images may be captured by an imaging sensing assembly coupled to the processor at a plurality of viewpoints and the step at 304 of extracting by the DL engine (216), a first set of attributes from each image in the set of images recorded at respective viewpoints based on a location template, the first set of attributes pertaining to center coordinates and radius of a region of interest of each image at the respective viewpoint and further at 306, the step of extracting, by the DL engine (216), a second set of attributes from the first set of attributes extracted, the second set of attributes pertaining to a set of predefined boundaries associated with the object.

Further, the method (300) may include the step at 308 of generating, by the DL engine (216), a mask for each set of predefined boundaries of the object and the step at 310 of merging, by the DL engine (216), the masks of each set of predefined boundaries of the object with each other to obtain a set of predefined vectors to be stored in a database associated with the processor.

FIG. 4 illustrates an exemplary traditional configuration of an imaging system in accordance with an embodiment of the present disclosure. As illustrated, in traditional methodology, a ground survey team marks buildings with small rectangles using a mobile application (402) and then a GIS expert validates the data uploaded by the survey team and marks polygons in the required area (404) and then may store the data generated in a GIS database (406) from where different entities may use the stored data for various applications (408).

FIGS. 5A-5B illustrate exemplary representations of configurations of operation of the imaging system in accordance with an embodiment of the present disclosure.

As illustrated in FIG. 5A, the automated system may include at least four modules such as a mapping module (504), DL Segmentation Module (506), Post processing module (508) and vectorization module (510). In an embodiment, the mapping module (504) may take the center coordinates and radius of a region of interest (502) and may download map tiles for the given region of interest at the highest resolution available from publicly available Map Services. The mapping module (504) may make use of parallel processing for efficient query and download of satellite maps.

In an embodiment, the DL segmentation module (506) may work on map tiles downloaded by the mapping module (504). The DL segmentation module (506) may take the map tile images as input and may generate at least four different pixels masks for background, building interior, building exterior and building separator pixel masks but not limited to the like for each tile. The DL segmentation module (506) may make use of Reverse Mask R-CNN model but not limited to it to obtain pixel masks in a cascaded manner. The deep-learning segmentation model may learn at least four attributes from input image:

Background
Building interior,
Building edges and
Building separators (i.e. the gap between two close buildings).

In an embodiment, the post processing module (508) may merge all the four different type of pixel masks to create a single building polygon mask for each building. The post processing module (508) may also stitch overlapping building regions from multiple tiles to create a unified polygon mask for the building.

In another embodiment, the vectorization module (510) may take the polygon masks and convert the polygon mask into geospatial shape files (512) ready for geospatial database ingestion.

FIG. 6 illustrates an exemplary representation of a flow diagram associated with an operational method in accordance with an embodiment of the present disclosure. In an aspect, a modified fully convolutional SSD network architecture may be used that may take at least a four channel input but not limited to it i.e RGB image (602) and a confidence zone mapping (604) may be trained with the RGB image as input and the target output the mask obtained from the cascaded segmentation stage and outputs bounding boxes parameterized by at least eight variables: the four corner points of the minimum area rectangle in clockwise order. The confidence mapping zone (604) may include background confidence zone (606), interior confidence zone (608), edge confidence zone (610) and separator confidence zone (612). The outputs from these blocks may be provided to a binary building map (614) and then sent to a vectorised building footprint (616) to obtain the footprint of the input data.

In an embodiment, the overall pipeline is a combination of cascaded-segmentation and oriented bounding box detection. In essence, the building extraction task is conceptualised as a multi-stage hierarchical learning problem. At the end of each stage, the output feature map is fused with the input RGB image and the concatenated representation becomes the input to the next stage. This strategy may allow higher-level concepts to learn from raw images in a bottom-up manner with a gradual increase in the learning complexity at each stage by exploiting a prior in the form of previous stage output to learn the next stage features. This ensures that anytime the model is not overwhelmed by the feature complexity in the initial stages. Unlike conventional object detection, the adopted approach estimates the pose, shape and size simultaneously. It also overcomes the convergence issues found in its five variable oriented object detection counterparts due to the use of a consistent scale and unit in all eight variables.

FIGS. 7A-7C illustrate exemplary representations for executing the operational method for image acquisition during test, image correlation, reconstruction of profile, object distance/depth calculation, in accordance with an embodiment of the present disclosure. As illustrates, in an aspect, the proposed method may use a Reverse Mask R-CNN but not limited to it. The Reverse Mask R-CNN may be an end-to-end fully convolutional architecture for building detection from cluttered imagery. A schematic diagram is shown in FIGS. 7A, 7B and 7C highlighting different components in a Cascaded Segmentation module (700). In an embodiment, the cascaded segmentation may include at least three stages namely: Confidence Zone Segmentation (702), Part Segmentation (704) and Diffusion (706).

In an exemplary embodiment, in a way of example and not as a limitation, all the three stages share the same encoder-decoder architecture, because of its ability to extract rotation-invariant representations. A Resnet-34 as the encoder module may be utilized, with dilated convolutions of kernel size of but not limited to 3 and dilation size of but not limited to 2, 5, and 7 in the decoder.

In an exemplary embodiment, the confidence zone segmentation module (702) may be trained with the RGB image as input and the target output is ground truth binary masks representing building/no-building regions. At this stage, the network attempts to narrow down the area of interest and learns coarse structures with fuzzy boundaries used for subsequent learning in the upcoming stages.

In an exemplary embodiment, the part segmentation module (704) may gradually increase the learning complexity by guiding the part segmentation module (704) to learn geometric properties of buildings as our target output. A set of morphological operations like area opening, thinning and area closing may be applied to decompose the original ground truth mask into four classes namely: building boundary, building interior, inter-building gaps (the strip of land separating two close buildings) and background.

Further, the part segmentation module (704) may be trained with a four-channel input consisting of three RGB channels and the output from confidence zone segmentation to yield the four classes of decomposed geometrical structures as target output. Essentially, the part segmentation module may be forced to learn the bottleneck i.e the boundary and its vicinity information, utilising the prior coming from the previous network. Each pixel competes to be assigned to one of the four classes and implicitly captures the geometric properties which are otherwise difficult to learn, like the pixels between two close buildings.

In an exemplary embodiment, the Diffusion module (706) may be trained with a seven-channel input consisting of an RGB input image as well as the output masks from part segmentation. The target output is the final ground truth binary masks representing building/no-building regions. Essentially, the Diffusion module (706) performs anisotropic diffusion over implicit deep learning features with wider context.

In another exemplary embodiment, an Oriented Object Detection (OBD) module (708) (also shown in FIG. 7C) may be applied after the cascaded-segmentation to simultaneously estimate the pose, shape and size of the building polygons. Essentially, the method yields simplified polygon boundaries through implicit polygon regularisation. Additionally, oriented object detection module (708) may isolate the boundaries of even adjacent buildings that get fused together into a single blob as a result of cascaded segmentation misclassifying one-pixel adjacent to both of them as a group of building pixels.

In an exemplary embodiment, the confidence zone segmentation module (702) may have at least one target class (C=1) with but not limited to sigmoid as its final destination function. In another exemplary embodiment, the part segmentation module (704) may have at least four target classes (C=4) with but not limited to softmax as the final destination function. In another exemplary embodiment, the diffusion module (706) may have at least one target classes (C=1) with but not limited to sigmoid as the final destination function. In yet another exemplary embodiment, the oriented object detection module (708) may have but not limited to Resnet-34 as encoder and regression as the final destination function.

FIG. 8 illustrates an exemplary model training process, in accordance with an embodiment of the present disclosure. As illustrated, in an aspect, satellites images at block 802 and building shapefiles at block 804 may be provided to a data converter at block 806 and then sent to satellite mask and geotiffs at block 808 the output of which may be sent to an infinity data generator at bock 810. The output from block 810 may be sent to a model training block 814 that may be processed with Reverse mask RCNN at block 812 and Hyper parameters at block 816 to generate a trained model at block 820 that may be tested with test AOI image at block 818 obtained from test AOI bounds at block 824 to obtain the vectorised output at block 822.

FIG. 9 illustrates an exemplary computer system in which or with which embodiments of the present invention can be utilized in accordance with embodiments of the present disclosure. As shown in FIG. 9, computer system (900) can include an external storage device (910), a bus (920), a main memory (930), a read only memory (940), a mass storage device (970), communication port (960), and a processor (970). A person skilled in the art will appreciate that the computer system may include more than one processor and communication ports. Examples of processor (970) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (970) may include various modules associated with embodiments of the present invention. Communication port (960 can be any of an RS-232 port for use with a modem-based dialup connection, a 10/100 Ethernet port, a Gigabit or 9 Gigabit port using copper or fiber, a serial port, a parallel port, or other existing or future ports. Communication port (960 may be chosen depending on a network, such a Local Area Network (LAN), Wide Area Network (WAN), or any network to which computer system connects. Memory 930 can be Random Access Memory (RAM), or any other dynamic storage device commonly known in the art. Read-only memory (940) can be any static storage device(s) e.g., but not limited to, a Programmable Read Only Memory (PROM) chips for storing static information e.g., start-up or BIOS instructions for processor (970). Mass storage (950) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 792 family) or Hitachi.

Bus (920) communicatively couples processor(s) (970) with the other memory, storage and communication blocks. Bus (920) can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (970) to software system.

Optionally, operator and administrative interfaces, e.g. a display, keyboard, joystick and a cursor control device, may also be coupled to bus (920) to support direct operator interaction with a computer system. Other operator and administrative interfaces can be provided through network connections connected through communication port (960). The external storage device (99) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

The present disclosure provides a method and system for automated Building Footprint Extraction using Satellite Imagery system with cascaded multitask segmentation framework reverse mask R-CNN. The unique solution provides extremely low cost when compared to specialized GIS talent needed to manually label and curate building boundaries, easy logistics to operationalize as any other software or application, infinite scalability as the process is completely automated and eliminates manual specialized labor (GIS Experts/Field Agents) and achieves results comparable to extraction from GIS specialists even in the most cluttered settlements in lesser time. Also, the method accounts for unplanned, remote, dense and cluttered urban as well as rural regions of developing nations like India previously unaccounted by the building detection community.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT DISCLOSURE

The present disclosure provides for a simple, compact, portable and cost-effective imaging system for non-contact and non-destructive measurement of full-field 3-dimensional profile of the surfaces of buildings and structures of a given location.

The present disclosure provides for a method for real-time, remote, in-situ and simultaneous extremely low-cost method when compared to specialized GIS talent needed to manually label and curate building boundaries.

The present disclosure provides for a method for an easy logistics to operationalize as any other software or application.

The present disclosure provides for a system and method that is infinitely scalable as the process is completely automated and eliminates manual labor and scaling requires only adding more servers.

The present disclosure provides for periodically identifying new settlement clusters (newly constructed buildings)

The present disclosure provides for a system and method for extending the same problem to infrastructure components like roads, bridges, flyovers etc.

We claim:

1. An automated imaging sensing system, said system comprising:
   an image module comprising one or more processors, wherein the one or more processors are coupled with a memory, wherein said memory stores instructions which when executed by the one or more processors causes said system to:
   receive a set of images of an object from an image sensing assembly, wherein the set of images are obtained at a plurality of viewpoints;
   extract, by using a Deep Learning (DL) engine, a first set of attributes from each image in the set of images recorded at respective viewpoints based on a location template, wherein the first set of attributes pertain to center coordinates and radius of the region of interest of each image at the respective viewpoints, wherein the DL engine is operatively coupled to the one or more processors;
   extract, by using the DL engine, a second set of attributes from the first set of attributes extracted, the second set of attributes pertaining to a set of predefined boundaries associated with the object;
   generate, by using the DL engine, a mask for each set of predefined boundaries of the object, wherein the mask is generated to assign each pixel of the image to one of the predefined boundaries of the object, and to capture geometric properties of the object;
   merge, by the DL engine, the mask of each set of predefined boundaries of the object with each other to obtain a set of predefined vectors to be stored in a database associated with the system;
   cascade, by a segmentation module coupled with the DL engine, a multi-class segmentation task to generate at least four different pixels masks for background, object interior, object exterior and object separator pixel masks in a hierarchal manner;
   merge, by a post processing module the generated at least four different pixels masks to generate a single building polygon mask for each building; and
   convert, by a vectorization module the generated polygon masks into geospatial shape files for geospatial database ingestion.

2. The system as claimed in claim 1, wherein the plurality of viewpoints refers to coordinates and radius of an object or region of interest, latitude, longitude of a region.

3. The system as claimed in claim 1, wherein the set of predefined boundaries comprises background, object interior, object edges and object separators.

4. The system as claimed in claim 1, wherein an object detection module is operatively coupled to the one or more processors, wherein the object detection module is configured to:
   process the extracted second set of attributes;
   obtain a set of features from the processed second set of attributes;
   map down one or more precise unique features of the object from the set of features obtained.

5. The system as claimed in claim 1, wherein the DL engine is further configured to:
   obtain a set of values of each image of the set of images;
   process the set of values of each said image to yield a set of predefined vectors; and
   generate a trained model configured from the set of predefined vectors.

6. The system as claimed in claim 5, wherein the DL engine is further configured to:

automate fetching of an image from the image sensing assembly to generate the predefined set of vectors specific to the image.

7. The system as claimed in claim 5, wherein the set of values of each image are any or a combination of red green blue (RGB) values, greyscale values, luma, and blue projection and red projection (YUV) values.

8. The system as claimed in claim 5, wherein the trained model is trained to take an image automatically as an input and return a minimum rotated bounding box for the object along with one or more pixel labels associated with the object.

9. The system as claimed in claim 1, wherein the image sensing assembly comprises one or more analog electronic input source configured for recording a plurality of physical parameters simultaneously with the set of images and a network connecting one or more camera sensors and the one or more analog input sources to the computing device.

10. A method for facilitating automated image sensing, said method comprising:

receiving, by an image module a set of images of an object from an image sensing assembly, wherein the set of images are obtained at a plurality of viewpoints, wherein the image module comprises one or more processors, wherein the one or more processors are coupled with a memory, wherein said memory stores instructions which are executed by the one or more processors;

extracting, by using a Deep Learning (DL) engine, a first set of attributes from each image in the set of images recorded at respective viewpoints based on a location template, wherein the first set of attributes pertain to center coordinates and radius of the region of interest of each image at the respective viewpoints, wherein the DL engine is operatively coupled to the one or more processors;

extracting, by using the DL engine, a second set of attributes from the first set of attributes extracted, the second set of attributes pertaining to a set of predefined boundaries associated with the object;

generating, by using the DL engine, a mask for each set of predefined boundaries of the object, wherein the mask is generated to assign each pixel of the image to one of the predefined boundaries of the object, and to capture geometric properties of the object;

merging, by the DL engine, the mask of each set of predefined boundaries of the object with each other to obtain a set of predefined vectors to be stored in a database associated with the system;

cascading, by a segmentation module, a multi-class segmentation task to generate at least four different pixels masks for background, object interior, object exterior and object separator pixel masks in a hierarchal manner;

merging, by a post processing module the generated at least four different pixels masks to generate a single building polygon mask for each building; and converting, by a vectorization module the generated polygon masks into geospatial shape files for geospatial database ingestion.

11. The method as claimed in claim 10, wherein the plurality of viewpoints refers to coordinates and radius of an object or region of interest, latitude, longitude of a region.

12. The method as claimed in claim 10, wherein the set of predefined boundaries comprises background, object interior, object edges and object separators.

13. The method as claimed in claim 10, wherein an object detection module is operatively coupled to the one or more processors, wherein the method further comprises the steps of:

processing, by the object detection module, the extracted second set of attributes;

obtaining, by the object detection module, a set of features from the processed second set of attributes; and, mapping down, by the object detection module, one or more precise unique features of the object from the set of features obtained.

14. The method as claimed in claim 10, wherein the method further comprises the steps of:

obtaining, by the DL engine, a set of values of each image of the set of images;

processing, by the DL engine, the set of values of each said image to yield a set of predefined vectors; and generating, by the DL engine, a trained model configured from the set of predefined vectors.

15. The method as claimed in claim 14, wherein the method further comprises the steps of:

automate fetching of an image, by the DL engine, from the image sensing assembly to generate the predefined set of vectors specific to the image.

16. The method as claimed in claim 14, wherein the set of values of each image are any or a combination of red green blue (RGB) values, greyscale values, luma, and blue projection and red projection (YUV) values.

17. The method as claimed in claim 14, wherein the trained model is configured to take an image automatically as an input and return a minimum rotated bounding box for the object along with one or more pixel labels associated with the object.

18. The method as claimed in claim 10, wherein the imaging sensing assembly comprises one or more analog electronic input source configured for recording a plurality of physical parameters simultaneously with the set of images and a network connecting one or more camera sensors and the one or more analog input sources to the computing device.

* * * * *